United States Patent [19]

Parkinson

[11] 3,730,581
[45] May 1, 1973

[54] VEHICLE POCKET ARRANGEMENT
[75] Inventor: Charles F. Parkinson, Troy, Mich.
[73] Assignee: General Motors Corporation, Detroit, Mich.
[22] Filed: June 28, 1971
[21] Appl. No.: 157,382

[52] U.S. Cl..................296/37 R, 2/247, 224/29 R, 296/152
[51] Int. Cl..............................................B60r 7/04
[58] Field of Search..................296/37 R, 146, 152; 224/29 R; 266/19.5 R; 190/52; 150/34; 49/70, 502; 2/247; 248/95, 99

[56] References Cited

UNITED STATES PATENTS

| 1,995,143 | 3/1935 | Burch | 296/37 R |
| 1,815,028 | 7/1931 | Burch | 296/152 X |
| 1,877,265 | 9/1932 | Chadwick | 296/37 R |

OTHER PUBLICATIONS

German Printed Application DAS 1,095,685 December 1960, Volkswagenwerk

Primary Examiner—Leo Friaglia
Assistant Examiner—Leslie J. Paperner
Attorney—W. E. Finken et al.

[57] ABSTRACT

A vehicle pocket arrangement for storing small items includes a downwardly depending flap covered with trim material and integral with a filler board of a vehicle body door trim panel. The flap is defined by a generally U-shaped aperture in the trim panel. A filler board member slightly larger than the depending flap has trim material secured to the lateral and lower edge portions thereof to provide a pocket panel having a generally upwardly opening pocket. The pocket panel is positioned to the rear of the trim panel and then moved upwardly to insert the flap within the pocket. The filler board member is thus located to the rear of the trim panel and overlying the U-shaped aperture. The filler board member is taped to the rear of the trim panel.

2 Claims, 5 Drawing Figures

PATENTED MAY 1 1973 3,730,581

INVENTOR.
Charles F. Parkinson
BY
Herbert Furman
ATTORNEY

VEHICLE POCKET ARRANGEMENT

This invention relates generally to vehicle pocket arrangements and, more particularly, to pocket arrangements wherein pocket panels are secured to vehicle trim panels to mount the pocket panels within vehicle compartments.

It is known to provide a vehicle pocket arrangement within a vehicle compartment for storing road maps, small tools, personal items, etc. One manner of constructing such a pocket arrangement is to first fabricate a trim panel and a pocket panel. The trim panel is fabricated from a filler board of a suitable fiberboard material or the like and is adaptable for mounting within a vehicle compartment, such as on a vehicle body door. The filler board is generally covered with a trim material, such as vinyl, leather, or another suitable upholstering material, to provide the trim panel with an aesthetically appealing appearance. An aperture is then cut in the trim panel generally to the shape of the pocket panel but of a slightly smaller size and the portion that is cut away is discarded. The pocket panel is also fabricated from a filler board covered with a trim material and edge portions of a generally flexible pocket material are secured to the trimmed filler board to provide a generally upwardly opening pocket. The pocket panel is then positioned adjacent the trim panel, with the pocket material interfitting generally within the aperture of the trim panel, and with the edge portions of the pocket panel generally overlapping the edge portions of the trim panel defining the aperture. The panels are then secured to each other by stitching the overlapping edge portions or by other suitable attaching methods for securely attaching the panels to each other.

With this type of pocket arrangement, the portion of the trim panel that is discarded, of course, represents waste. While it would appear advantageous to use this wasted portion of the trim panel for fabricating the pocket panel, this is not possible since there would then be no overlapping of the edge portions to allow the secure attachment of the panels to each other. Also, the attachment between the panels must be relatively strong since normal forces during manual depositing and removal of articles from the pocket tend to separate the panels. For this reason, the use of an adhesive tape or the like to secure the panels to each other is not generally practical.

This invention provides an improved vehicle pocket arrangement in which the trim panel includes a generally U-shaped aperture defining a generally downwardly depending flap received within the pocket of the mounted pocket panel in a downwardly inserted relationship.

Accordingly, one feature of this invention is that it provides a vehicle pocket arrangement in which the pocket panel does not have to be covered with a trim material since the trim material of the downwardly depending flap provides a finished appearance to the interior of the pocket.

Another feature of this invention is that with the depending flap of the trim panel received within the pocket of the pocket panel, the panels are substantially fixed relative to each other and attachment of the panels by adhesive tape or the like is sufficient to maintain the panels relative to each other during normal use.

These and other features of this invention will be readily apparent from the following detailed description and drawings in which.

Figure 1:
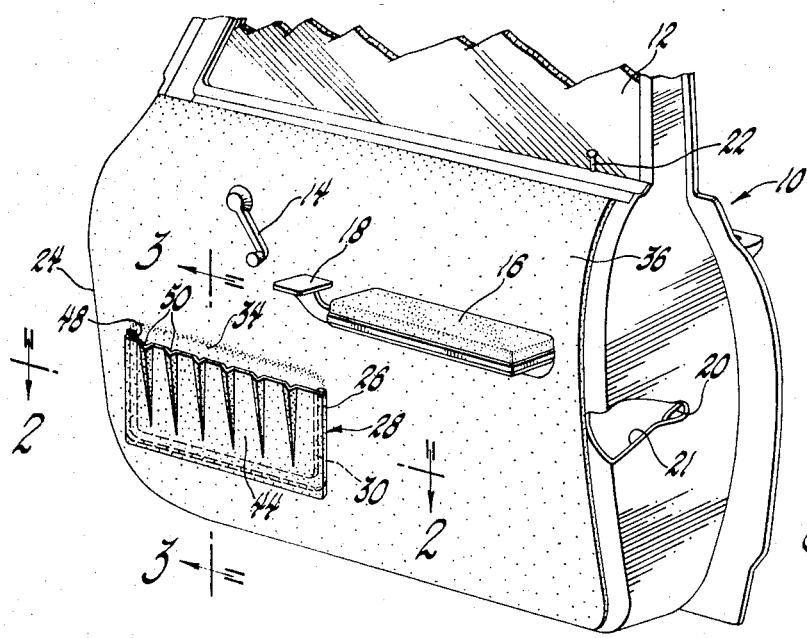
FIG. 1 is a partial perspective view of a vehicle body door including an inner trim panel supporting a pocket panel to provide a pocket arrangement according to this invention.

Referring to FIG. 1 of the drawings, a vehicle body door generally indicated by 10 conventionally supports a side window 12 movable between raised and lowered positions in the usual manner by a window regulator handle 14. A conventional armrest 16 is suitably mounted on door 10 slightly rearward of an inside remote handle 18 that is actuatable to unlatch the latch mechanism of a door lock assembly whose bolt is partially shown at 20 adjacent the closed end of a keeper receiving slot 21. A garnish button 22 is conventionally connected to the lock mechanism of the door lock assembly to prevent unlatching of bolt 20 by actuation of handle 18. Adjacent the lower forward portion of door 10, the door inner trim panel 24 supports a pocket panel 26 to provide a pocket arrangement 28, according to this invention.

Figure 2:
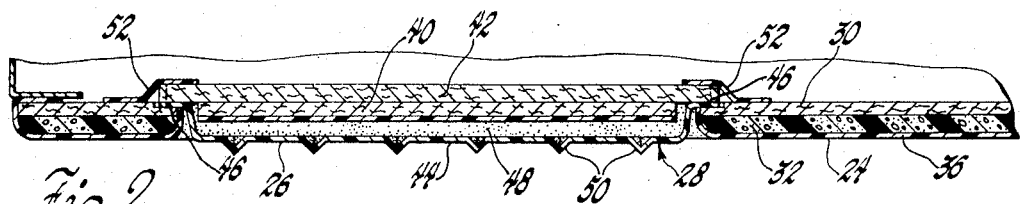
FIG. 2 is an enlarged sectional view of the pocket arrangement taken generally along line 2—2 of FIG. 1.
Figure 4:
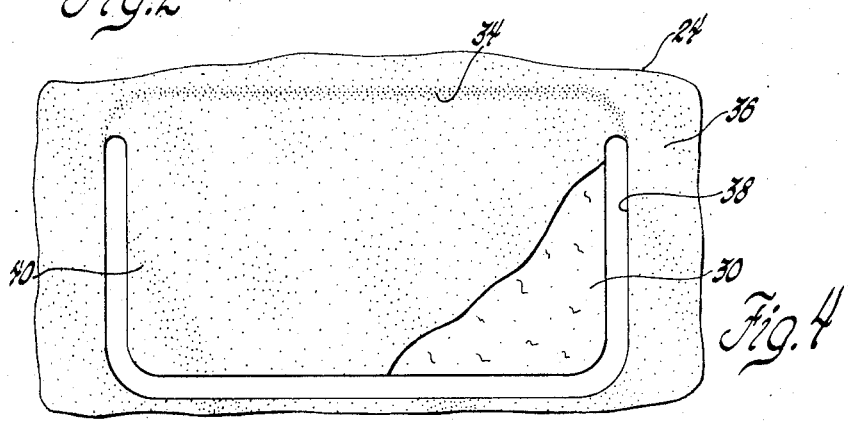
FIG. 4 is an enlarged view of a portion of the trim panel of FIG. 1 with the pocket panel removed to show the downwardly depending flap normally received within the pocket of the mounted pocket panel.
Figure 3:
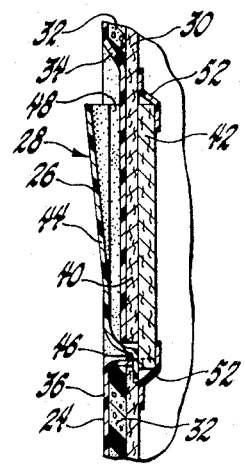
FIG. 3 is an enlarged sectional view of the pocket arrangement taken generally along line 3—3 of FIG. 1.

As can be seen by additionally referring to FIGS. 2 through 4, trim panel 24 includes a filler board 30 which is of a suitable fiberboard material or the like. A layer of foam padding 32 is adhesively secured to the major portion of filler board 30 but has a generally rectangular portion 34 cut away adjacent the pocket arrangement 28. A suitable trim material 36, such as vinyl or the like, is adhesively secured to the foam padding 32 and adjacent the rectangular portion 34 is secured directly to filler board 30. A generally U-shaped aperture 38 is formed within the trim panel 24 and provides a generally downwardly depending flap 40.

Figure 5:
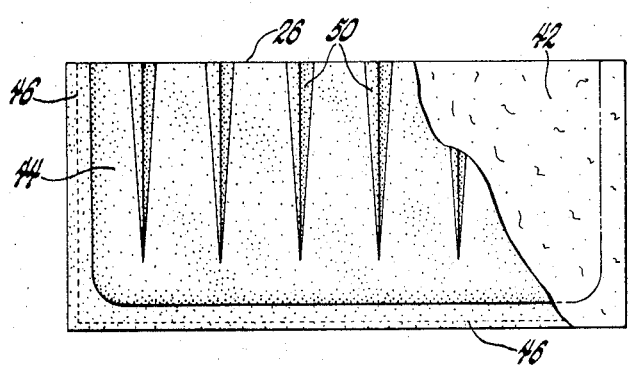
FIG. 5 is an enlarged view of the pocket panel removed from the trim panel.

Referring additionally now to FIG. 5, the pocket panel 26 includes a filler board 42 of a slightly larger size then the rectangular outline generally defined by aperture 38. As seen in FIG. 5, a generally rectangular piece of flexible pocket material 44 has lateral and lower edge portions stitched at 46 to filler board 42 to define a generally upwardly opening pocket 48 best seen in FIG. 3. Pocket material 44 includes downwardly pointing integral portions 50 allowing expansion of the pocket size during depositing of articles within the pocket. The pocket material may also be of a somewhat more flexible material with elastic sewn across the upper edge to provide the required expansion.

To assemble the pocket panel 26 to the trim panel 24, the pocket panel is positioned generally perpendicular to the rear face of the trim panel with the opening of the pocket generally adjacent the lower edge of flap 40. The pocket panel 26 is then rotated to insert the lower portion of flap 40 within the pocket, and then moved upwardly to downwardly insert flap 40 in pocket 48 and position the panels relative to each other generally as shown in FIGS. 1 through 3. The board 42 overlies the flap and panel 26 around the aperture 38. Adhesive tape 52 is then applied to the filler boards 30 and 42 to position the panels relative to each other. With the panels in the assembled position, the trim material 36 on flap 40 provides a finished appearance to the interior of pocket 48 and the lateral forces exerted on the assembled pocket panel 26 are resisted by the trim panel 24 and by the flap 40.

The invention thus provides an improved vehicle pocket arrangement.

What is claimed is:

1. A vehicle pocket arrangement comprising, a first filler board adaptable for mounting within a vehicle body compartment and including a downwardly depending flap, trim means covering the side of the first filler board that faces inwardly of the compartment to provide a trim panel, a second filler board slightly larger than the depending flap, pocket means secured to the second filler board generally adjacent the lateral and lower edge portions thereof to provide a pocket panel with a generally upwardly opening pocket, and means securing the pocket panel to the trim panel with the depending flap received within the pocket in a downwardly inserted relationship.

2. A vehicle pocket arrangement comprising, a first filler board adaptable for mounting within a vehicle body compartment and including a generally U-shaped aperture defining a downwardly depending flap, trim means covering the side of the first filler board that faces inwardly of the compartment to provide a trim panel, a second filler board slightly larger than the depending flap, pocket means secured to the second filler board generally adjacent the lateral and lower edge portions thereof to provide a pocket panel with a generally upwardly opening pocket, and adhesive means securing the pocket panel to the trim panel with the depending flap received within the pocket in a downwardly inserted relationship.

* * * * *